United States Patent
Adams et al.

(10) Patent No.: US 7,139,623 B2
(45) Date of Patent: Nov. 21, 2006

(54) METHOD AND APPARATUS FOR USE OF MULTIPLE CONTROL SYSTEMS

(75) Inventors: James S. Adams, Phoenix, AZ (US); Ashley Noble, New South Wales (AU)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 11/022,157

(22) Filed: Dec. 23, 2004

(65) Prior Publication Data

US 2005/0228510 A1    Oct. 13, 2005

(51) Int. Cl.
*G05B 15/00* (2006.01)
*G05B 11/01* (2006.01)
*G08B 5/22* (2006.01)
*H03M 11/00* (2006.01)
*H03K 17/94* (2006.01)

(52) U.S. Cl. ............................ 700/84; 700/17; 700/20; 700/83; 700/85; 702/180; 702/181; 702/182; 715/788; 340/825.36; 340/407.2; 341/22; 341/27; 341/34

(58) Field of Classification Search ................. 700/19, 700/20, 17, 83, 84–85, 245; 340/825–36, 340/34, 407.2; 715/788; 702/180, 181, 702/182; 341/22, 27

See application file for complete search history.

(56) References Cited

U.S. PATENT DOCUMENTS

| | | | | |
|---|---|---|---|---|
| 4,303,973 A | * | 12/1981 | Williamson et al. | 700/84 |
| 4,551,719 A | * | 11/1985 | Carlin et al. | 340/825.36 |
| 5,461,716 A | * | 10/1995 | Eagen et al. | 715/788 |
| 5,896,915 A | * | 4/1999 | Westbrooks et al. | 165/11.1 |
| 5,995,916 A | * | 11/1999 | Nixon et al. | 702/182 |
| 6,066,824 A | * | 5/2000 | Crawford et al. | 219/86.31 |
| 2005/0004707 A1 | * | 1/2005 | Kazi et al. | 700/245 |
| 2005/0040248 A1 | * | 2/2005 | Wacker et al. | 236/51 |
| 2005/0228510 A1 | * | 10/2005 | Adams et al. | 700/20 |
| 2006/0012510 A1 | * | 1/2006 | Rowe | 342/42 |

* cited by examiner

*Primary Examiner*—Ramesh Patel
(74) *Attorney, Agent, or Firm*—Paul D. Greeley

(57) ABSTRACT

A method and apparatus for simultaneously controlling multiple control systems is provided. The resulting hybrid control system provides for sharing of inputs and outputs on a control surface membrane between the multiple distinct control systems. A unified tactile/LED interface for both systems is achieved, allowing for a single hybrid control system experience for operators in industrial, manufacturing and control-room environments.

23 Claims, 6 Drawing Sheets

METHOD AND APPARATUS FOR USE OF MULTIPLE CONTROL SYSTEMS

BACKGROUND OF THE INVENTION

1. Field of the Invention

This disclosure relates generally to control of industrial systems and the like, and more particularly, to a method and apparatus for simultaneous use of multiple control systems.

2. Description of the Related Art

In control systems for industrial processes and the like, such as, for example, oil refineries and manufacturing plants, upgrades of the control system are a frequent occurrence. Such upgrades are due in part to advancements in technology, as well as changing needs in the industry. These upgrades result in changes being made to portions of the control system, while the overall system remains in place. However, upgrades are often less efficient than wholesale replacement of the control systems because of the need to work within the existing architecture of the system.

Where major changes are desired, wholesale replacement of the control system is often done. However, replacement of the control system is a costly venture in both implementation and training of the operator.

Accordingly, there is a need for a method and apparatus to implement a new or primary control system, which is cost effective. There is a further need for such a method and apparatus that allows for simultaneous use of the old or secondary system with the primary system. The method and apparatus described herein provides for simultaneous use of multiple process control systems and sharing of an operator interface between the systems. The method and apparatus described herein provides the technical effect of allowing operator control of more than one control system simultaneously, thereby more efficiently and effectively controlling a particular industrial process or facility. The technical effect includes, but is not limited to, enabling an existing large customer base to move toward utilization of next-generation control systems by providing a control-membrane solution that accommodates simultaneous interaction with two or more systems, which provides a unified hybrid-control experience. The technical effect further includes, but is not limited to, annunciation and control-membrane sharing between at least two distinct control systems thereby creating a single hybrid control system.

SUMMARY OF THE INVENTION

A method and apparatus for sharing inputs and outputs on a control surface membrane between at least two distinct control systems is provided. A unified tactile/LED interface for both systems is achieved, allowing for a single hybrid control system experience for operators in industrial, manufacturing and control-room environments. Alarm annunciations, such as, for example, console and system alarms, can be combined to reflect the highest level across both control systems. User-configurable annunciations may be filtered based on the system for which they are configured, including, but not limited to, having the primary system trump the secondary system. Control-membrane annunciation LED's can correspond to control-membrane keys. Operator control-membrane key-presses may be routed to either one, or the other, or all of the control systems. In the presence of only a single control system, all of the activity is owned by the present system.

In one aspect, a method of controlling at least a first control system and a second control system is provided that comprises providing an operator interface that is communicatively coupled to the first and second control systems; determining if a key-press from the operator interface is shared by the first and second control systems and communicating the key-press to the first and second control systems if the key-press is shared; and determining which of the first and second control systems owns the key-press if the key-press is not shared by the first and second control systems and communicating the key-press to the first or second control system that owns the key-press.

In another aspect, a method of modifying a first control system is provided that comprises communicatively coupling a control surface membrane to the first control system; communicatively coupling a second control system to the control surface membrane; determining if a key-press from the control surface membrane is shared by the first and second control systems and communicating the key-press to the first and second control systems if the key-press is shared; determining which of the first and second control systems owns the key-press if the key-press is not shared by the first and second control systems and communicating the key-press to the first or second control system that owns the key-press; generating an annunciation for either or both of the first and second control systems; determining if the annunciation is shared by the first and second control systems and communicating the annunciation to the control surface membrane if the annunciation is shared; and determining which of the first and second control systems owns the annunciation if the annunciation is not shared by the first and second control systems and communicating the annunciation to an indicator of the control surface membrane that corresponds to the first or second control system that owns the annunciation.

In a further aspect, a hybrid control system is provided that comprises a first control system, a second control system and a control processing unit. The control processing unit has an operator interface, and is in communication with the first and second control systems. The control processing unit determines if a key-press of the operator interface is shared by the first and second control systems and communicates the key-press to the first and second control systems if the key-press is shared. The control processing unit also determines which of the first and second control systems owns the key-press if the key-press is not shared by the first and second control systems and communicates the key-press to the first or second control system that owns the key-press.

In yet another aspect, a computer readable program embodied in an article of manufacture is provided that comprises computer readable program instructions for modifying a first control system with a second control system. The program comprises program instructions for causing a computer to determine if a key-press of an operator interface is shared by the first and second control systems and for causing the computer to communicate the key-press to the first and second control systems if the key-press is shared; and program instructions for causing the computer to determine which of the first and second control systems owns the key-press if the key-press is not shared by the first and second control systems and for causing the computer to communicate the key-press to the first or second control system that owns the key-press.

The method can also determine whether each of the first and second control systems are in an active state that allows for acceptance of communication of the key-press. The first control system would only accept the communication of the key-press when in the active state and the second control system would only accept the communication of the key-press when in the active state. The annunciation may be a first annunciation of the first control system and a second annunciation of the second control system. The communication of the annunciation to the operator interface can comprise caching the first and second annunciations and combining the first and second annunciations in a single communication to the operator interface. The annunciation may also be a plurality of annunciations that are cached, such that one of the plurality of annunciations is determined to be of higher priority than another of the plurality of annunciations, and that higher priority annunciation is communicated to the operator interface. The operator interface can be communicatively coupled to a control processing unit having a foreground application and a background application being processed therein. The key-press can be processed by the background application.

The above-described and other features and advantages of the present disclosure will be appreciated and understood by those skilled in the art from the following detailed description, drawings, and appended claims.

DETAILED DESCRIPTION OF THE INVENTION

Figure 1:
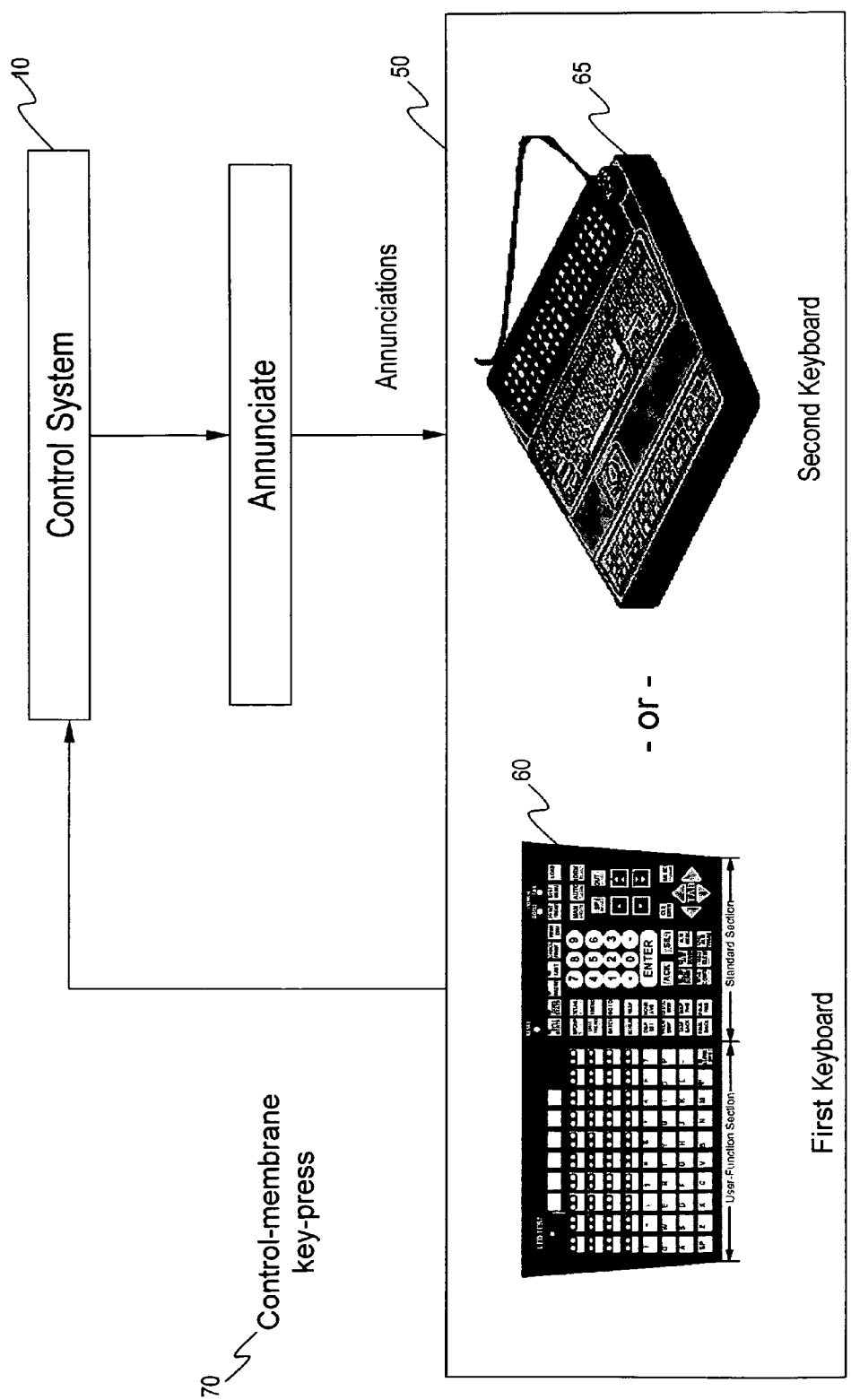
FIG. 1 is a flow chart illustrating communication utilizing an operator interface and a single control system.

Referring to the drawings, and in particular to FIG. 1, a control system 10 is shown in communication with a control-processing unit 50 (hereinafter "CPU"). CPU 50 is described herein by way of example as a control-processing unit. However, it is contemplated by the present disclosure for CPU 50 to include any programmable circuit, such as, but not limited to, computers, processors, microcontrollers, microcomputers, programmable logic controllers, application specific integrated circuits, and other programmable circuits, as well as any number of such devices. CPU 50 has an operator interface which is shown as control surface membrane or first keyboard 60. However, alternative operator interfaces can also be used, one of which is shown as second keyboard 65. The actuation of keys on keyboard 60 can provide inputs to the control system 10, while annunciations from the control system can be provided back to the keyboard and, in particular, to indicators on the keyboard.

Figure 2:
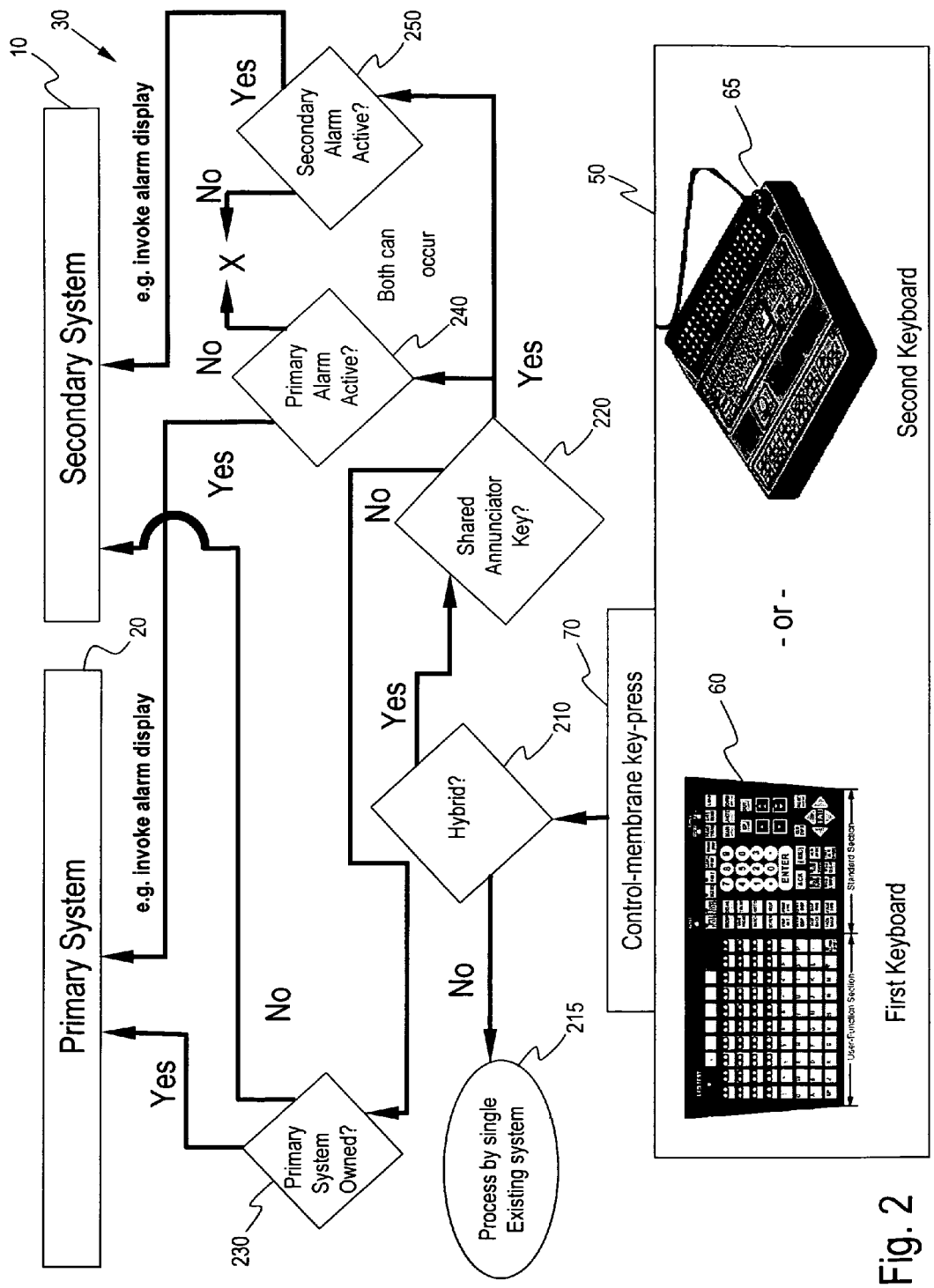
FIG. 2 is a flow chart illustrating input communication utilizing an operator interface and primary and secondary control systems in an exemplary hybrid control system.
Figure 3:
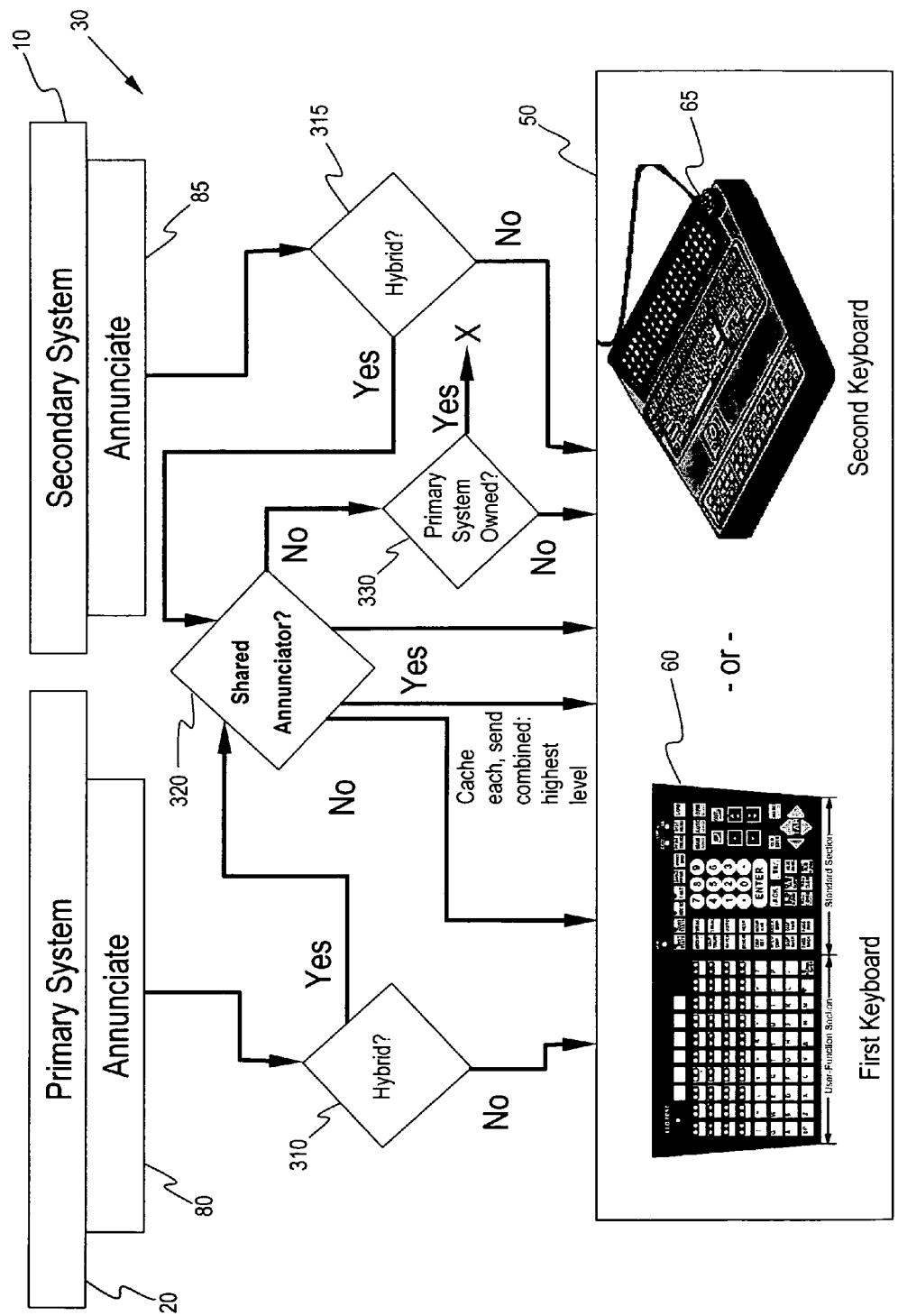
FIG. 3 is a flow chart illustrating output communication utilizing an operator interface and primary and secondary control systems in the exemplary hybrid control system of FIG. 2.

Referring to FIGS. 2 and 3, an additional control system, i.e., primary system 20, can be implemented in conjunction with the already existing control system 10. In the exemplary embodiment, the newly added control system 20 becomes the primary system as will be described hereinafter, while the existing control system 10 becomes the secondary control system. However, the present disclosure contemplates the newly added control system 20 taking a secondary or subservient role to the already existing control system 10. Also, while the exemplary embodiment of FIGS. 2 and 3 illustrate CPU 50 communicating with two control systems, the present disclosure contemplates the use of more than two control systems being in communication with CPU 50 and keyboard 60.

Primary and secondary systems 20 and 10 function simultaneously, and are both in communication with CPU 50. As such, the primary and secondary systems 20 and 10 may be considered subsystems of the resulting hybrid control system 30. CPU 50 is in communication with primary and secondary control systems 20 and 10 through a physical connection. However, other methods and structures can be utilized to provide for the communication between the CPU 50 and the primary and secondary control systems 20 and 10. The present disclosure refers to keys, key-presses, inputs and signals as the communication between various components of the hybrid system 30, in particular between the keyboard 60 and the primary and secondary control systems 20 and 10, and the form or type of such communication is not intended to be limited.

As shown in FIG. 2, operator control-membrane actuations, keystrokes or key-presses 70 (e.g., key-presses of first keyboard 60) and their corresponding signals are selectively routed to either one, the other, or both of control systems 20 and 10. The routing of key-presses 70 is based upon determining ownership of the key-press, i.e., which of the primary or secondary systems 20 and 10 is intended to receive and process the information associated with the key-press. An operator can invoke commands on either or both of primary system 20 and secondary system 10 by selecting special-function keys on keyboard 60 or another control surface membrane. In step 210, it is determined whether the control system is hybrid, i.e., having two or more control systems 20 and 10. In the presence of only one control system, all activity is owned and processed by the present system as indicated in step 215. However, where two or more systems are present resulting in the hybrid control system 30, a determination is made in step 220 as to whether key-press 70 is a shared key. If key-press 70 is not a shared key, then step 230 determines to which of the control systems the input associated with the key-press is intended. The key-press 70 is then forwarded to the selected control system, which in this exemplary embodiment is either primary system 20 or secondary system 10.

In steps 240 and 250, where key-press 70 has been determined to be shared by the primary and secondary systems 20 and 10, it is also determined if either or both of the primary and secondary system alarms are active. If the alarms are active, the key-press 70 is forward to the respective system. This may also include the situation where the alarms for both the primary and secondary systems 20 and 10 are active. If neither alarm is active, then the key-press 70 is not forwarded to either the primary or secondary systems 20 and 10.

As shown in FIG. 3, when either or both of the primary and secondary systems 20 and 10 generate annunciations 80 and 85, such as, for example, control-membrane LED outputs or indicators, these annunciations are compared, filtered and/or processed so as to provide a single hybrid control system experience. In steps 310 and 315, it is determined whether the control system is hybrid, i.e., having two or more control systems 20 and 10. As with the key-presses 70 of FIG. 2, in the presence of only one control system, the annunciations 80 and 85 will be forwarded to the keyboard 60.

However, where two or more systems are present resulting in the hybrid control system 30, a determination is made in step 320 as to whether annunciations 80 and 85 are shared. If annunciation 80 is not shared, then it is forwarded to the keyboard 60 as a primary system annunciation. If annunciation 85 is not shared, then it is determined in step 330 whether the annunciation is owned by the primary system 20. If annunciation 85 is not owned by the primary system 20, then it is forwarded to the keyboard 60 as a secondary system annunciation. If annunciation 85 is owned by the primary system 20, then it is not forwarded to the keyboard 60.

If in step 320 it is determined that annunciations 80 and 85 are shared, then the annunciations are cached and communicated as a combined signal representative of the annunciations. Preferably, alarm type annunciations, such as, for example, console alarms or system alarms, are combined to reflect the highest or most significant level across both the primary and secondary control systems 20 and 10. User-configurable annunciations preferably are filtered based upon the control system for which they are configured, such as, for example, primary system annunciation 80 trumping secondary system annunciation 85. Control membrane annunciation LED's or other indicators preferably correspond to the keys of control-membrane or keyboard 60.

Figure 4:
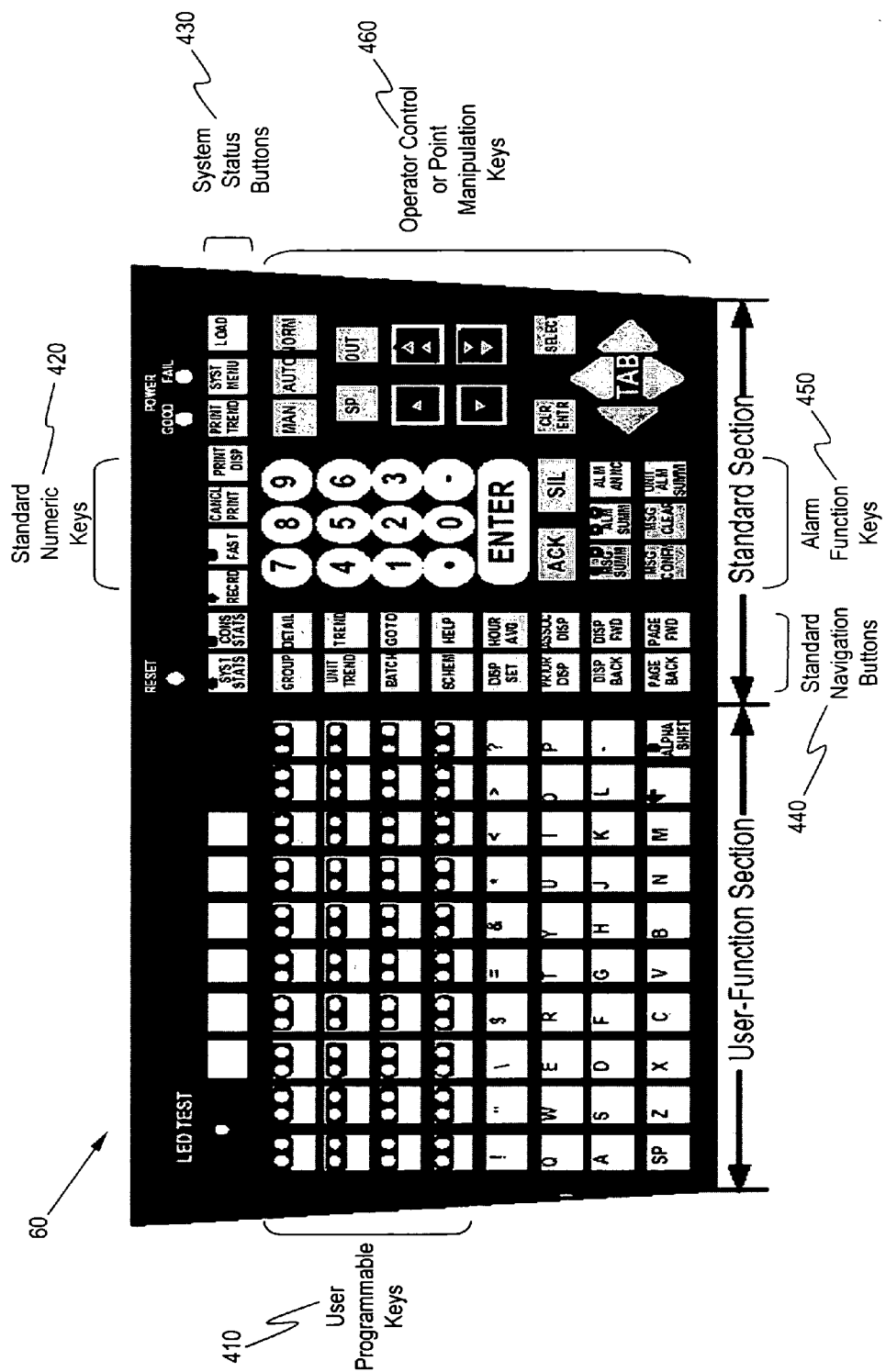
FIG. 4 is a schematic illustration of a control surface membrane used for the operator interface with the hybrid control system of FIGS. 2 and 3.
Figure 5:
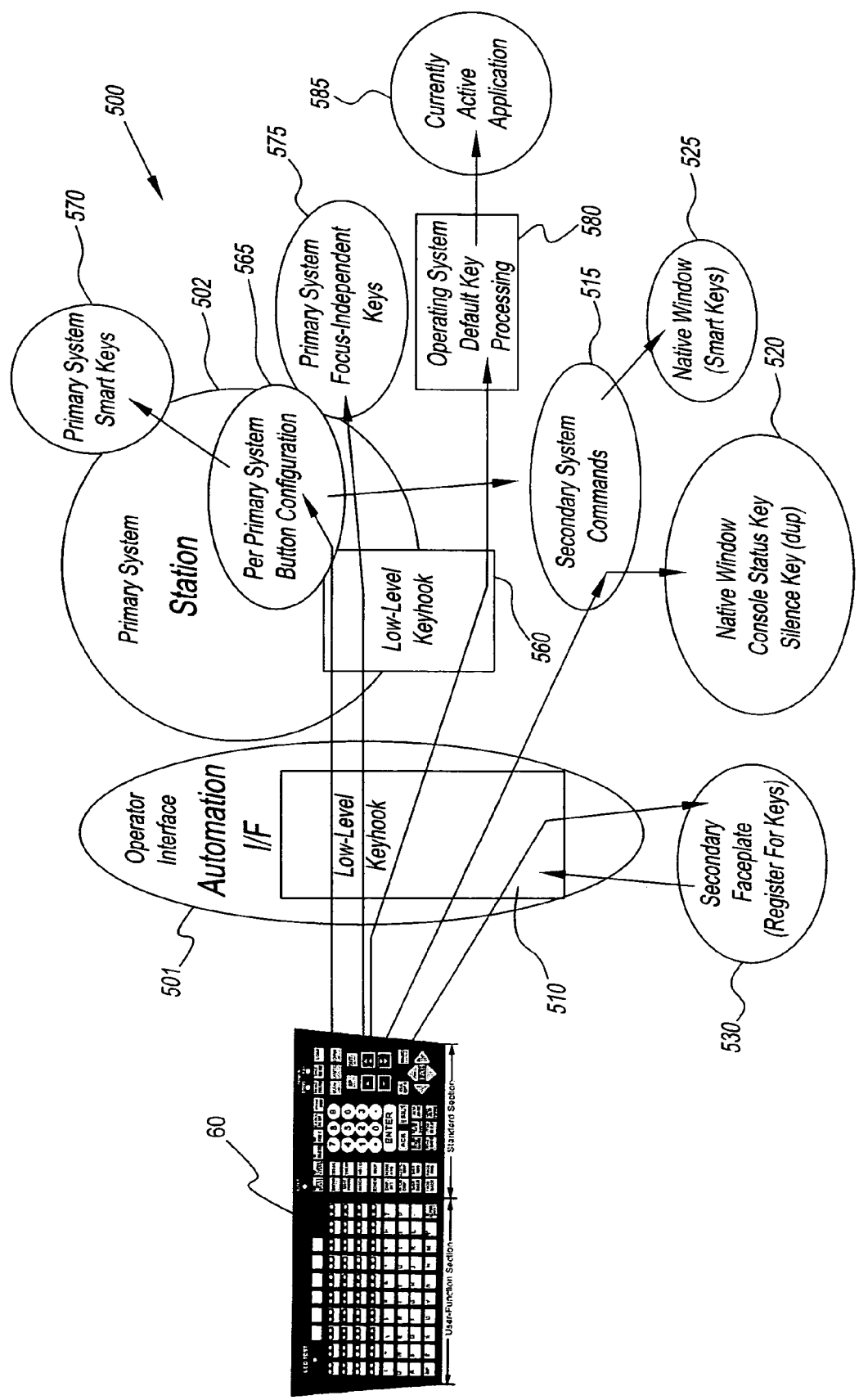
FIG. 5 is a schematic illustration of operator interface input processing for the control surface membrane of FIG. 4 with the hybrid control system of FIGS. 2 and 3.
Figure 6:
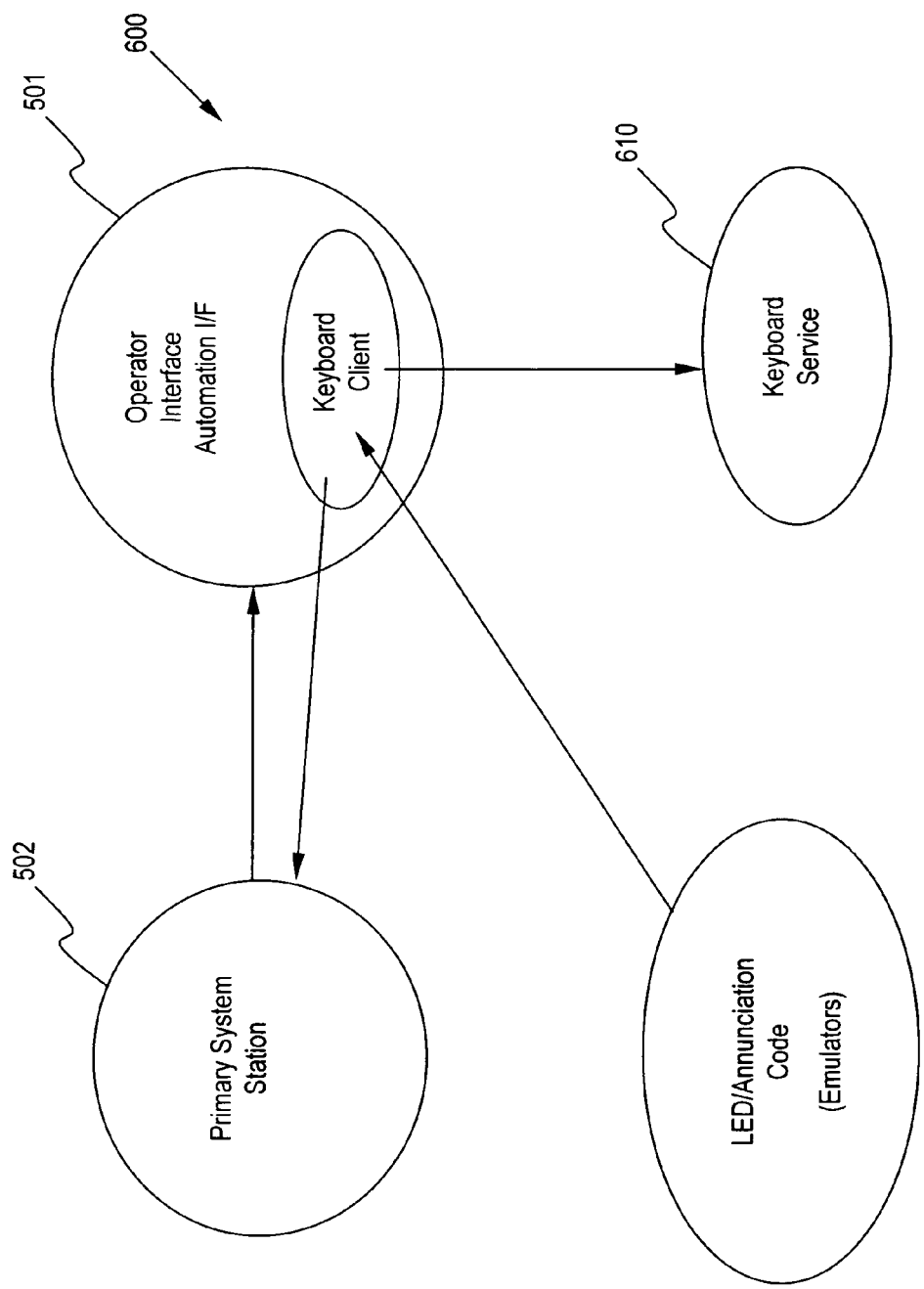
FIG. 6 is a schematic illustration of operator interface output processing for the control surface membrane of FIG. 4 with the hybrid control system of FIGS. 2 and 3.

Referring to FIGS. 4 through 6, an exemplary embodiment of hybrid control system 30 will now be described with respect to the keyboard 60. As described above, keyboard 60 is an example of an operator interface and, in particular, a control surface membrane, that can be used to implement hybrid control system 30. However, the present disclosure contemplates the use of other operator interfaces, with similar and/or distinct functions for its keys that can be processed by the hybrid control system 30 for the simultaneous control of two or more control systems.

Hybrid control system 30 provides the means for an operator to retain the existing operational features and functions of secondary system 10 while utilizing the new features and functions available with primary system 20. This is accomplished through sharing of the control surfaces, e.g., the screens and keyboard 60. Screen surface management is provided via an operating system, such as, for example, WINDOWS®, and can be augmented with workspace display management software, such as, for example, SAFEVIEW®. The operating system provides focus-dependent sharing of standard keyboard keys by routing standard keystrokes to whichever application, software or computer program display has the foreground, i.e., is currently active and highlighted. Hybrid control system 30 provides a consistency of response, and minimizes operator confusion over how the control system responds to operator interactions.

Keyboard 60 provides additional primary control surfaces to the operator via smart or user programmable keys 410, standard numeric keys 420, system status buttons 430, standard navigation buttons 440, alarm function keys 450 and operator control or point manipulation keys 460. The particular keys and their functions are detailed in tables 1 through 4:

TABLE 1

| Key | Function |
| --- | --- |
| SYST STATS | Calls up the System Status Display for one or both control systems based on cached alarm status. Key backlight blinks when there is an unacknowledged system alarm and is steady when alarm(s) is ACKnowledged. |
| CONS STATS | Calls up the Console Status and Assignments Display for one or both control systems based on cached alarm status. Key backlight blinks when there is an unacknowledged Console alarm and is steady when alarm(s) is ACKnowledged. |
| RECRD | Activates trend-pen recording of a selected point. Trend pen recording is activated from the Operating Group Display by pressing the RECRD key. This key is backlit while recording is in progress. Pressing the key a second time terminates the recording operation. |
| FAST | (1) Causes the update rate for Hiway-related display information to increase to 2-second intervals instead of the standard update rate of once every four seconds. (2) Can cause certain parameters in custom displays to update twice a second, if so configured. The key backlight comes On for fast update. |
| CANCL PRINT | Used to abort any currently printing Trend on any printer in the console. When pressed, the prompt asks the operator to enter the console-related printer number. Cancel Print does not function across stations with different personalities. |
| PRINT DISP | The display currently on the Native Window is printed on the station's assigned printer. |
| PRINT TREND | Activates trend printing for a selected point. Trends for all points in an operating group can be printed on the Matrix Printer. |
| SYST MENU | Calls up the System Menu Display. |
| LOAD | Prepares the Universal Station for personality loading. |

TABLE 2

| Key | Function |
| --- | --- |
| GROUP | Calls up the Group Display; requires entry of Group Number. |
| DETAIL | Calls up the Detail Display for a given point; requires entry of a Tagname (Point ID). |
| UNIT TREND | Calls up the Unit Trend Display; requires entry of a Unit ID. |
| TREND | Calls up the Group Trend Display from the Operating Group Display, by selecting a point to be trended and pressing the Trend Key. |
| GO TO | Used to select a point on the Group Display; requires entry of the point's position (1–8) on the Group Display. |

TABLE 2-continued

| Key | Function |
| --- | --- |
| SCHEM | Calls up a graphic Schematic Display; requires entry of a Schematic name. |
| HELP | Calls up a pre-configured operator Help display associated with the current display. The Help display could take the form of a prompt, a maintenance suggestion, or a reference to a related display for additional information. |
| HOUR AVG | Calls up the Hourly Averages Display from the Operating Group Display. |
| PRIOR DISP | Calls up the display that was shown immediately before the current display. If pressed while viewing a Group Trend Display, it cancels the Group Trend Display and returns to the Group Display. |
| ASSOC DISP | Calls up the configured display associated with an item chosen form the current display. |
| DISP BACK | Calls up the next lower numbered display with the same type of display as the current display. |
| DISP FWD | Calls up the next higher-numbered display within the same type of display as the current display. |
| PAGE BACK | Calls up the next lower-numbered page of a multiple-page display. |
| PAGE FWD | Calls up the next higher-numbered page of a multiple-page display. Both Page Forward and Page Back keys have a wraparound feature. In other words, if Page Forward is requested from the last page of a multiple-page display, the first page of the display is called up. Wraparound also applies when paging in the opposite direction. |

TABLE 3

| Key | Function |
| --- | --- |
| ACK | (Alarm Acknowledge) Acknowledged all Process Alarms or System Status Alarms for the console; must be used when an Alarm or System Status Display is displayed. Silences the Audible Alarm, if it has not already been silenced. |
| SIL | Silences all audible alarms in the console. |
| MSG SUMM | Calls up the Message Summary Display. The key is backlit, blinks whenever there are messages that require operator acknowledgement. The key is lit steadily whenever all messages have been acknowledged, but messages still exist that require operator confirmation. |
| ALM SUMM | Calls up the Area Alarm Summary Display. The Alarm Summary Key lights whenever an Alarm Event is received by the Universal Station, and remains lit as long as alarms exist in the area. There are two backlights, red and yellow, that indicate the Priority and Acknowledgement state of the alarms. |
| ALM ANNC | Calls up the Alarm Annunciation Display. |
| MSG CONFM | This key is associated with the Message Summary Display. Messages are acknowledged and/or confirmed (if necessary) from this display. Position the cursor to any message desired on the display (using Fast Raise/Lower keys) and press Message Confirmation Key to confirm the message. Confirmation is message by message. |
| MSG CLEAR | This key is used to clear messages that have been acknowledged and confirmed on the Message Summary Display. Clearing is page by page. |
| UNIT ALM SUMM | Calls up the Unit Alarm Summary Display; requires entry of a Unit ID. |

TABLE 4

| Key | Function |
| --- | --- |
| MAN | Places selected point in manual mode; Output is under operator direct control. |
| AUTO | Places a selected point in automatic mode if configured for that mode. In automatic mode, the Output (OP) value is calculated by a pre-configured algorithm using an operator-entered setpoint (SP). |
| NORM | Places the selected point in its normally configured mode. |
| SP | Permits changes to be made to setpoint values for a point. When pressed, changes made via the numeric keys or by the Raise/Lower keys. |

TABLE 4-continued

| Key | Function |
|---|---|
| OUT | Permits changes of Analog or Digital Output values. After the key is pressed (e.g., while viewing a Detail Display), the Output value can be changed by a keyboard entry, or by the Raise/Lower keys. |
| SINGLE ARROW KEYS | Digital State Change function: while viewing a Digital or Flag Point display, the Up-Arrow key can be configured to indicate an ON or OFF state of a Digital Output point. The Down-Arrow is configured for the opposite state.<br>The Slow Raise/Lower operation function: allows the operator to increase or decrease a selected value or parameter shown on a display. |
| DOUBLE ARROW KEYS | Pressing the double up-arrow key causes the selected parameter to be increased at the configured fast rate, and pressing the double down-arrow key causes the parameter to be decreased at the configured fast rate. |
| CLR ENTR | Clears an incorrect or unwanted operator entry at any time BEFORE the ENTER key is pressed. When Native Window not in focus, this key is DEL. |
| SELECT | Selects an item at the current cursor position. Target's function is called up by pressing the SELECT key. |
| TAB KEYS | These four keys are used to position the cursor vertically or horizontally to any point on the display. |

Additionally, the smart keys 410 function to perform a user-defined action. The standard numeric 420 provide for data via numeric values to be displayed on the screen in the data-entry field character-by-character and transmitted to the owner of the data, where the display is updated to reflect the new value.

Certain of the key-presses 70 of keyboard 60 are always routed to the foreground application and are defined as focus-dependent keys. Others of these keys are processed independent of which application currently has the foreground, and are defined as focus-independent keys. The hybrid system 30 utilizes a native window, which is the particular application that is providing universal station functionality (operator interface displays) for the secondary control system nodes. Hybrid system 30 utilizes an application called "station" to embody operator interface displays for interaction with the primary control system nodes. These applications represent the preferred embodiment of "foreground applications" for their respective control systems. Hybrid system 30 also has a secondary system faceplate, which provides for direct receipt of certain key-presses 70, as will be discussed later.

As shown in FIG. 5, runtime key handling for keyboard 60 is preferably implemented by an input scheme 500 that has an operator automation interface 501, a primary system station 502, and first and second low-level system wide keyboard hooks or keyhooks 510 and 560. Keyhook 510 routes certain keys to the native window 520 and 525 via secondary system commands 515 when it has focus, and directly to the secondary system faceplate 530 when it has focus. Keyhook 560 routes smart keys 410 based on the button configuration 565 of the primary control system 20, and also routes focus-independent keys 575 directly to the primary system station 502. A subset of the smart keys 410 may be routed to the native window for processing via a call to secondary system commands 515 based on the primary system button configuration 565. Other focus dependent keys are passed through both of keyhooks 510 and 560, and are processed per the default behavior of the operating system keystroke handling 580, by any currently active window 585. However, the primary control system 20 is responsible for LED annunciations for the focus-dependent keys of keyboard 60. Therefore, these indications do not change to native window control even if the native window is selected. The existing secondary system 10 is preferably modified by the hybrid system 30 such that all LED output requests are processed by the primary system 20, which then determines whether to allow such requests to proceed.

As shown in FIG. 6, through use of output or annunciation scheme 600, hybrid control system 30 modifies the portion or subsystem of the secondary system 10 that drives the LED outputs directly from the processor board to the keyboard 60, in order to output indirectly through calls made to the primary system station 502. The primary system station 502 utilizes the automation server 610 to make LED annunciation outputs to the keyboard 60.

Shown in tables 5 through 8 below, are the various keys or key-presses 70 of keyboard 60, and how they are processed by hybrid system 30 based upon the possible window activation states, i.e., the window that has the foreground and is highlighted. Typically, a foreground application processes all keyboard inputs. However, hybrid system 30 modifies this behavior and provides for background applications, i.e., non-active or non-foreground applications, to process selected key-presses 70.

TABLE 5

| Smart Keys | native window has foreground | primary system is active | secondary system faceplate is selected | 3rd Party or no application active |
|---|---|---|---|---|
| Keys configured in primary system to be routed to native window | native window | native window | native window | native window |
| Keys configured to be processed by primary system | primary system | primary system | primary system | primary system |

TABLE 6

| Focus-Independent Keys | native window has foreground | primary system is active | secondary system faceplate is selected | 3rd Party or no application active |
|---|---|---|---|---|
| SYST STATS | primary system if primary alarm active or native window (secondary system) if secondary alarm active; both primary system and native window if both alarms are active; native window if neither alarm is active | primary system if primary alarm active or native window (secondary system) if secondary alarm active; both primary system and native window if both alarms are active; native window if neither alarm is active | primary system if primary alarm active or native window (secondary system) if secondary alarm active; both primary system and native window if both alarms are active; native window if neither alarm is active | primary system if primary alarm active or native window (secondary system) if secondary alarm active; both primary system and native window if both alarms are active; native window if neither alarm is active |
| ALM SUMM | primary system | primary system | primary system | primary system |
| UNIT ALM SUMM | primary system | primary system | primary system | primary system |
| CONS STATS | primary system if primary alarm active or native window (secondary system) if secondary alarm active; both primary system and native window if both alarms are active; native window if neither alarm is active | primary system if primary alarm active or native window (secondary system) if secondary alarm active; both primary system and native window if both alarms are active; native window if neither alarm is active | primary system if primary alarm active or native window (secondary system) if secondary alarm active; both primary system and native window if both alarms are active; native window if neither alarm is active | primary system if primary alarm active or native window (secondary system) if secondary alarm active; both primary system and native window if both alarms are active; native window if neither alarm is active |
| SYST MENU | primary system | primary system | primary system | primary system |
| GROUP | primary system but native window if a group number | primary system but native window if a group number | primary system but native window if a group number | primary system but native window if a group number |
| DETAIL | primary system but native window if secondary system point | primary system | secondary system faceplate | primary system |
| UNIT TREND | primary system | primary system | primary system | primary system |
| SCHEM | primary system but native window if a native window schem. | primary system but native window if a native window schem. | primary system but native window if a native window schem. | primary system but native window if an native window schem. |
| MSG SUMM | primary system | primary system | primary system | primary system |
| SIL | native window & primary system | native window & primary system | native window & primary system | native window & primary system |
| ALM ANNC | primary system | primary system | primary system | primary system |
| PRIOR DISP | native window | primary system | primary system | primary system |

TABLE 7

| Focus-Dependent Keys | native window has foreground | primary system is active | secondary system faceplate is selected | 3rd Party or no application active |
|---|---|---|---|---|
| Standard keyboard & function keys | native window | primary system | secondary faceplate | Per 3rd party application |
| ACK | native window | primary system | secondary faceplate | Per 3rd party application |
| TREND | native window | primary system | secondary faceplate | Per 3rd party application |
| MSG CONFM | native window | primary system | secondary faceplate | Per 3rd party application |
| MSG CLEAR | native window | primary system | secondary faceplate | Per 3rd party application |
| RECRD | native window | primary system | secondary faceplate | Per 3rd party application |
| CANCL PRINT | native window | primary system | secondary faceplate | Per 3rd party application |
| PRINT TREND | native window | primary system | secondary faceplate | Per 3rd party application |
| LOAD | native window | primary system | secondary faceplate | Per 3rd party application |
| GOTO | native window | primary system | secondary faceplate | Per 3rd party application |
| HELP | native window | primary system | secondary faceplate | Per 3rd party application |
| HOUR AVG | native window | primary system | secondary faceplate | Per 3rd party application |
| BATCH | native window | primary system | secondary faceplate | Per 3rd party application |
| ASSOC DISP | native window | primary system | secondary faceplate | Per 3rd party application |
| DISP BACK | native window | primary system | secondary faceplate | Per 3rd party application |
| DISP FWD | native window | primary system | secondary faceplate | Per 3rd party application |
| PAGE BACK | native window | primary system | secondary faceplate | Per 3rd party application |
| PAGE FWD | native window | primary system | secondary faceplate | Per 3rd party application |
| PRINT DISP | native window | primary system | secondary faceplate | Per 3rd party application |

TABLE 8

| Focus-Dependent Keys | native window has foreground | primary system is active | secondary system faceplate is selected | 3rd Party or no application active |
|---|---|---|---|---|
| DISP SET | native window | primary system | secondary faceplate | per 3rd party application |
| FAST | native window | primary system | secondary faceplate | per 3rd party application |
| Numeric Keypad + ENTER key | native window | primary system | secondary faceplate | per 3rd party application |
| MAN/AUTO/NORM SP/OUT Raise/Lower/Fast-Raise/Fast-Lower keys | native window | primary system | secondary faceplate | per 3rd party application |
| Tab Arrow keys | native window | primary system | secondary faceplate | per 3rd party application (converted to std arrow keys) |

The Console Status key is preferably re-routed to the native window in all cases. The SILENCE key is processed by primary system 20, but in order to notify other stations in the same console, this key is duplicated and routed explicitly to the native window by the low-level hook 510. The System Status and Console Status keys are examples of shared annunciator keys as indicated in Table 6.

The secondary system faceplate control 530 provides for direct receipt of certain keys, such as, for example, Detail and PMK keys, when the secondary system faceplate window receives focus. The direct receipt by the secondary system faceplate control 530 is via a call to the existing keyhook logic as shown in FIG. 5, i.e., it registers itself. Upon de-activation, the secondary system faceplate control 530 unregisters from the direct receipt so as to allow multiple secondary system faceplates to operate simultaneously.

For example, where an operator selects a smart key 410, the corresponding key-press 70 is processed by primary system 20 and determined to be forwardable to the native window. This key stroke is emulated via a call to secondary system commands 515 except where the smart key is configured for direct processing by the primary system 20.

As another example, where an operator selects a fixed-function key with native window focus, such as, for example, the ACK key, the corresponding key-press 70 is processed by the native window due to the native window being the foreground application.

As yet another example, where an operator selects a secondary system faceplate 530, it becomes highlighted to indicate an "active" status and registers to receive specific key-presses 70 directly from the low-level hook 510. As long as the secondary system faceplate 530 is selected, it continues to receive these key-presses 70. When the secondary system faceplate 530 is deselected by the operator, it unregisters so as not to receive these key-presses 70.

As yet a further example, where an operator selects the SILENCE Key, the low-level hook 510 creates a duplicate SILENCE key message and forwards it to the native window. The native window processes the SILENCE key as normal and forwards the key-press 70 corresponding to the SILENCE key to the primary system 20 for processing.

It should be noted that the terms "first", "second" and the like, are used herein to modify various elements. These modifiers do not necessarily imply a spatial, sequential, or hierarchical order to the modified elements unless specifically stated.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A method of controlling at least a first control system and a second control system comprising:
    providing an operator interface that is communicatively coupled to the first and second control systems;
    determining if a key-press from said operator interface is shared by the first and second control systems and communicating said key-press to the first and second control systems if said key-press is shared, said key-press actuating an operation parameter adjustment of said first and second control systems; and
    determining which of the first and second control systems owns said key-press if said key-press is not shared by the first and second control systems and communicating said key-press to the first or second control system that owns said key-press.

2. The method of claim 1, further comprising determining whether each of the first and second control systems are in an active state that allows for acceptance of communication of said key-press, wherein the first control system only accepts said communication of said key-press when in said active state and the second control system only accepts said communication of said key-press when in said active state.

3. The method of claim 1, further comprising:
    generating an annunciation for either or both of the first and second control systems;
    determining if said annunciation is shared by the first and second control systems and communicating said annunciation to said operator interface if said annunciation is shared; and
    determining which of the first and second control systems owns said annunciation if said annunciation is not shared by the first and second control systems and communicating said annunciation to an indicator of said operator interface that corresponds to the first or second control system that owns said annunciation.

4. The method of claim 3, wherein said annunciation is a first annunciation of the first control system and a second annunciation of the second control system, and wherein communicating said annunciation to said operator interface comprises caching said first and second annunciations and combining said first and second annunciations in a single communication to said operator interface.

5. The method of claim 3, wherein said annunciation is a plurality of annunciations that are cached, wherein one of said plurality of annunciations is determined to be of higher priority than another of said plurality of annunciations, and wherein said one of said plurality of annunciations is communicated to said operator interface based upon said higher priority.

6. The method of claim 1, wherein said operator interface is communicatively coupled to a control processing unit having a foreground application and a background application being processed therein, and wherein said key-press is processed by said background application.

7. A method of modifying a first control system comprising:
    communicatively coupling a control surface membrane to the first control system;
    communicatively coupling a second control system to said control surface membrane;
    determining if a key-press from said control surface membrane is shared by said first and second control systems and communicating said key-press to said first and second control systems if said key-press is shared, said key-press actuating an operation parameter adjustment of said first and second control systems;
    determining which of said first and second control systems owns said key-press if said key-press is not shared by said first and second control systems and communicating said key-press to said first or second control system that owns said key-press;
    generating an annunciation for either or both of said first and second control systems;
    determining if said annunciation is shared by said first and second control systems and communicating said annunciation to said control surface membrane if said annunciation is shared; and
    determining which of said first and second control systems owns said annunciation if said annunciation is not shared by said first and second control systems and communicating said annunciation to an indicator of said control surface membrane that corresponds to said first or second control system that owns said annunciation.

8. The method of claim 7, further comprising determining whether each of said first and second control systems are in an active state that allows for acceptance of communication of said key-press, wherein the first control system only accepts said communication of said key-press when in said active state and said second control system only accepts said communication of said key-press when in said active state.

9. The method of claim 7, wherein said annunciation is a first annunciation of the first control system and a second annunciation of said second control system, and wherein communicating said annunciation to said control surface membrane comprises caching said first and second annunciations and combining said first and second annunciations in a single communication to said control surface membrane.

10. The method of claim 7, wherein said annunciation is a plurality of annunciations that are cached, wherein one of said plurality of annunciations is determined to be of higher priority than another of said plurality of annunciations, and wherein said one of said plurality of annunciations is communicated to said control surface membrane based upon said higher priority.

11. The method of claim 7, wherein said control surface membrane is communicatively coupled to a control processing unit having a foreground application and a background application being processed therein, and wherein said key-press is processed by said background application.

12. A hybrid control system comprising:
    a first control system and a second control system;
    a control processing unit having an operator interface, said control processing unit being in communication with said first and second control systems, wherein said control processing unit determines if a key-press of said operator interface is shared by said first and second control systems and communicates said key-press to said first and second control systems if said key-press is shared, said key-press actuating an operation parameter adjustment of said first and second control systems, and wherein said control processing unit determines which of said first and second control systems owns said key-press if said key-press is not shared by the first and second control systems and communicates said key-press to said first or second control system that owns said key-press.

13. The system of claim 12, wherein said control processing unit determines whether each of said first and second control systems are in an active state that allows for acceptance of communication of said key-press, wherein said control processing unit only communicates said key-press to said first control system when said first control system is in said active state, and wherein said control processing unit only communicates said key-press to said second control system when said second control system is in said active state.

14. The system of claim 12, wherein an annunciation is generated for either or both of said first and second control systems, wherein said control processing unit determines if said annunciation is shared by said first and second control systems and communicates said annunciation to said operator interface if said annunciation is shared, and wherein said control processing unit determines which of said first and second control systems owns said annunciation if said annunciation is not shared by said first and second control systems and communicates said annunciation to an indicator of said operator interface that corresponds to said first or second control system that owns said annunciation.

15. The system of claim 14, wherein said annunciation is a first annunciation of said first control system and a second annunciation of said second control system, and wherein said control processing unit caches said first and second annunciations and combines said first and second annunciations in a single communication to said operator interface.

16. The system of claim 14, wherein said annunciation is a plurality of annunciations that are cached by said control processing unit, wherein one of said plurality of annunciations is determined by said control processing unit to be of higher priority than another of said plurality of annunciations, and wherein said control processing unit communicates said one of said plurality of annunciations to said operator interface based upon said higher priority.

17. The system of claim 12, wherein said control processing unit has a foreground application and a background application being processed therein, and wherein said key-press is processed by said background application.

18. A computer readable program embodied in an article of manufacture comprising computer readable program instructions for modifying a first control system with a second control system, said program comprising:
program instructions for causing a computer to determine if a key-press of an operator interface is shared by the first and second control systems and for causing said computer to communicate said key-press to the first and second control systems if said key-press is shared, said key-press actuating an operation parameter adjustment of said first and second control systems; and
program instructions for causing said computer to determine which of the first and second control systems owns said key-press if said key-press is not shared by the first and second control systems and for causing said computer to communicate said key-press to the first or second control system that owns said key-press.

19. The program of claim 18, further comprising:
program instructions for causing said computer to determine whether each of the first and second control systems are in an active state that allows for acceptance of communication of said key-press;
program instructions for causing said computer to only communicate said key-press to the first control system when the first control system is in said active state; and
program instructions for causing said computer to only communicate said key-press to the second control system when the second control system is in said active state.

20. The program of claim 18, further comprising:
program instructions for causing said computer to determine if an annunciation that is generated for either or both of the first and second control systems is shared by the first and second control systems and for causing said computer to communicate said annunciation to said operator interface if said annunciation is shared; and
program instruction for causing said computer to determine which of the first and second control systems owns said annunciation if said annunciation is not shared by the first and second control systems and for causing said computer to communicate said annunciation to an indicator of said operator interface that corresponds to the first or second control system that owns said annunciation.

21. The program of claim 20, wherein said annunciation is a first annunciation of the first control system and a second annunciation of the second control system, and the program further comprises:
program instructions for causing said computer to cache said first and second annunciations; and
program instructions for causing said computer to combine said first and second annunciations in a single communication to said operator interface.

22. The program of claim 20, wherein said annunciation is a plurality of annunciations, and the program further comprises:
program instructions for causing said computer to cache said plurality of annunciations;
program instructions for causing said computer to determine a higher priority for one of said plurality of annunciations; and
program instructions for causing said computer to communicate said one of said plurality of annunciations to said operator interface based upon said higher priority.

23. The program of claim 18, wherein said computer has a foreground application and a background application being processed therein, and the program further comprises program instructions for causing said computer to communicate said key-press to said background application for processing.

* * * * *